(12) United States Patent
Larsson et al.

(10) Patent No.: US 11,709,976 B2
(45) Date of Patent: Jul. 25, 2023

(54) DETERMINING THEVENIN EQUIVALENT MODEL FOR A CONVERTER SYSTEM

(71) Applicant: ABB Schweiz AG, Baden (CH)

(72) Inventors: Mats Larsson, Rupperswil (CH); John Eckerle, Basel (CH)

(73) Assignee: ABB SCHWEIZ AG, Baden (CH)

( * ) Notice: Subject to any disclaimer, the term of this patent is extended or adjusted under 35 U.S.C. 154(b) by 248 days.

(21) Appl. No.: 17/102,772

(22) Filed: Nov. 24, 2020

(65) Prior Publication Data

US 2021/0165933 A1 Jun. 3, 2021

(30) Foreign Application Priority Data

Nov. 28, 2019 (EP) ..................................... 19212092

(51) Int. Cl.
| | | |
|---|---|---|
| G06F 30/20 | (2020.01) | |
| H02J 3/00 | (2006.01) | |
| G06F 113/04 | (2020.01) | |
| G06F 111/10 | (2020.01) | |

(52) U.S. Cl.
CPC ............... *G06F 30/20* (2020.01); *H02J 3/00* (2013.01); *G06F 2111/10* (2020.01); *G06F 2113/04* (2020.01); *H02J 2203/20* (2020.01)

(58) Field of Classification Search
CPC ..... H02J 2203/20; H02J 3/00; G06F 2111/10; G06F 2113/04; G06F 30/20
USPC .......................................................... 703/2
See application file for complete search history.

(56) References Cited

U.S. PATENT DOCUMENTS

| | | | |
|---|---|---|---|
| 9,140,731 | B2 | 9/2015 | Francis et al. |
| 9,562,939 | B2 | 2/2017 | Verhulst et al. |
| 2010/0026317 | A1 | 2/2010 | Collins, Jr. et al. |
| 2013/0099800 | A1 | 4/2013 | Francis et al. |

(Continued)

FOREIGN PATENT DOCUMENTS

| | | |
|---|---|---|
| EP | 2827157 A1 | 1/2015 |
| EP | 3301777 A1 | 4/2018 |

(Continued)

OTHER PUBLICATIONS

Iftakhar (Thevenin Equivalent Cir alent Circuit Estimation and Application for P cuit Estimation and Application for Power System Monitoring and Protection, (76 pages)). (Year: 2008).*

(Continued)

*Primary Examiner* — Andre Pierre Louis
(74) *Attorney, Agent, or Firm* — Greenberg Traurig, LLP

(57) ABSTRACT

A method for determining a converter Thevenin equivalent model for a converter system, includes: receiving measurement values of a coupling point voltage and a coupling point current measured at a point of common coupling between a grid emulator system and the converter system, wherein the grid emulator system supplies the converter system with a supply voltage; and determining a converter Thevenin impedance and a converter Thevenin voltage source of the converter Thevenin equivalent model by inputting the measurement values of the coupling point voltage and of the coupling point current into a coupled system model, which includes equations modelling the converter system and the grid emulator system and from which the converter Thevenin impedance and a converter Thevenin voltage source are calculated.

20 Claims, 4 Drawing Sheets

(56) References Cited

U.S. PATENT DOCUMENTS

2014/0032148 A1 1/2014 Verhulst et al.
2016/0322818 A1* 11/2016 Malengret ............. G05B 15/02

FOREIGN PATENT DOCUMENTS

GB 2521414 A 6/2015
WO 2012052190 A1 4/2012

OTHER PUBLICATIONS

Familiant et al., "Ac Impedance Measurement Techniques," IEEE International Conference on Electric Machines and Drives, May 15, 2005, San Antonio, Texas, 8 pp.
European Patent Office, Extended Search Report issued in corresponding Application No. 19212092.1, dated May 21, 2020, 12 pp.
Alenius et al., "Impedance-Based Stability Analysis of Multi-Parallel Inverters Applying Total Source Admittance," 2019 20th Workshop on Control and Modeling for Power Electronics, IEEE, Jun. 17, 2019, 8 pp.
Schoerle et al., "Automotive High Voltage Grid Simulation Modelling and simulation high voltage car grids from system prospective," Proceedings of the 2014 International Symposium on Electromagnetic Compatibility, Gothenburg, Sweden, Sep. 1-4, 2014, pp. 426-431.
Hashmi et al., "Online Thevenin Equivalent Parameter Estimation using Nonlinear and Linear Recursive Least Square Algorithm," Jul. 20, 2016, 6 pp., Retrieved from the Internet: https://arxiv.org/ftp/arxiv/papers/1610/1610.05142.pdf.

* cited by examiner

DETERMINING THEVENIN EQUIVALENT MODEL FOR A CONVERTER SYSTEM

FIELD OF THE INVENTION

The invention relates to a method, a computer program, a computer-readable medium and an evaluation device for determining a converter Thevenin equivalent model for a converter system. Furthermore, the invention relates to a converter system.

BACKGROUND OF THE INVENTION

Due to the increase of renewable energy sources, the power grids experience a large increase in the number of converter systems in the moment. Converter based generation and loads are different from conventional directly connected generation through synchronous machines and directly connected resistive and motor loads, in that the intermediate power electronic converters employ fast switching in a frequency range from 100 Hz up to several kHz, which causes the production of harmonics, which are injected to the grid. Whereas in the past, the converter systems had a small impact on the power system operation, since the share of converters connected was small, this is no longer the case, especially in special types of networks like offshore wind farms and solar farms where all generation is converter connected.

From a mathematical point of view it is easy to show that the impact of converter generated harmonics on the grid is influenced not only by the converter system itself, but also by the grid to which it is connected. A commonly used model for the analysis of the steady state impact of converter harmonics on the grid is a Thevenin equivalent model, in which the converter system is replaced with an equivalent voltage source and an equivalent impedance connected in series, which are given over a spectrum of frequencies.

There are several known methods, how information about a converter system may be determined. For example, U.S. Pat. No. 2,014,032 148 A1 describes a method for impedance measurement in a three-phase AC system, wherein a shunt perturbation signal is injected into the three-phase AC system.

In U.S. Pat. No. 2,013,099 800 A1, a controller and infrastructure for an impedance analyzer is used to determine a transfer function for each phase of a multi-phase system with a source and a load from which the impedance of each of the source and load can be calculated.

ALENIUS HENRIK ET AL: "Impedance-Based Stability Analysis of Multi-Parallel Inverters Applying Total Source Admittance", 2019 20TH WORKSHOP ON CONTROL AND MODELING FOR POWER ELECTRONICS (COMPEL), IEEE, 17 Jun. 2019 (2019-06-17), pages 1-8, is a scientific article, which proposes a stability analysis of a plurality of inverters connected in parallel to an electrical grid. Voltages and currents to the grid are measured and from this with a simulation, impedances of the grid and of the inverters are obtained. Models of the inverters and a Thevin equivalent model of the grid are used.

DESCRIPTION OF THE INVENTION

It is an objective of the invention to provide better information about the electrical behaviour of a converter system and to simplify the gathering of this information.

This objective is achieved by the subject-matter of the independent claims. Further exemplary embodiments are evident from the dependent claims and the following description.

A first aspect of the invention relates to a method for determining a converter Thevenin equivalent model for a converter system. The converter system may comprise a converter and an electrical machine, such as a motor or generator. The converter system furthermore may comprise a prime mover, which is driven by the electrical machine and/or converters the electrical machine. The converter system also may be connected to a photovoltaic system. The converter and/or the electrical machine may be parts of a medium voltage system and/or may be adapted for processing currents of more than 100 A and/or more than 1 kV.

A Thevenin equivalent model may be a model comprising an equivalent voltage source and an equivalent impedance interconnected in series, which are provided for a range and/or set of frequencies. The equivalent voltage source and the equivalent impedance may be provided for each phase of the system, which is modelled. As a rule, the systems described in the following may have three phases, however, the method also may be performed for one-phase or two-phase systems.

According to an embodiment of the invention, the method comprises: receiving measurement values of a coupling point voltage and of a coupling point current measured at a point of common coupling between a grid emulator system and the converter system, wherein the grid emulator system supplies the converter system with a supply voltage. The measurement values may be recorded over a time period, in which the grid emulator system is supplying the converter system with an emulated grid voltage, i.e. the supply voltage. The emulator system itself may comprise a converter, which generates the emulated grid voltage from a real grid voltage. To this end, the emulated grid voltage may be slightly varied in frequency and/or magnitude to improve the system response of the converter system.

The measurement values of a coupling point voltage and of a coupling point current may be measured for each phase of the point of common. It also may be that the measurement signals provided by the measurement values over time are transformed from the time domain into the frequency domain.

According to an embodiment of the invention, the method further comprises: determining a converter Thevenin impedance and a converter Thevenin voltage source of the converter Thevenin equivalent model by inputting the measurement values of the coupling point voltage and of the coupling point current into a coupled system model, which comprises equations modelling the converter system and the grid emulator system and from which the converter Thevenin impedance and a converter Thevenin voltage source are calculated.

A Thevenin impedance may comprise a complex value for each frequency in a range and/or set of frequencies. A Thevenin voltage source may comprise a real value for each frequency in a range and/or set of frequencies. Furthermore, the values of the Thevenin impedance and the Thevenin voltage source may be provided for each phase of the converter system.

The measurement values may be produced with a voltage sensor and a current sensor at the point of common coupling. The point of common coupling is the interconnection point of the grid emulator system and the converter system. There, the voltage and the current are measured, when the overall system is operating. With the coupled system model, the overall coupled test system, i.e. the grid emulator system and the converter system, may be modelled together. In such a way, also the impact of the grid on the response of the converter system may be modelled. The grid emulator system may be modelled with a grid emulator model. Together with the converter Thevenin model, equations may be determined from the coupled system model, for example with the aid of Kirchhoff's rules. These equations model the electrical behaviour of the coupled system and therefrom, for example, with the known measurement values from the point of common coupling, the parameters of the converter Thevenin model, i.e. the converter Thevenin impedance and a converter Thevenin voltage source, can be calculated.

The coupled system model and/or the equations may be implemented as functions in a computing device. When the measurement values are input to this function and evaluated, the converter Thevenin impedance and a converter Thevenin voltage source can be determined.

Later, when the converter system is operating in the field, connected to a large-scale electrical grid, the converter Thevenin impedance and a converter Thevenin voltage may be used to optimize the operation of the large-scale electrical grid, for example by an operator of the large-scale electrical grid.

According to an embodiment of the invention, the grid emulator system is modelled with a set of grid emulator elements, each of which has grid emulator parameters. The grid emulator model may be modelled with grid emulator elements, such as a voltage source and one or more impedances.

Also this voltage source may be modelled as real values for a range/set of frequencies and optional one or more phases. The one or more impedances may be modelled as complex values for a range/set of frequencies and optional one or more phases. The grid emulator parameters may be this real and/or complex values.

The grid emulator elements may reflect real components of the grid emulator and/or equivalence models thereof, such as a converter, a transformer, a filter, etc.

For example, the grid emulator parameters may comprise at least one of a grid voltage source, a grid series impedance interconnecting the grid voltage source with the point of common coupling and/or a grid shunt impedance, which may be connected to the point of common coupling and/or may earth the point of common coupling. The grid voltage source may model a converter. The grid series impedance may model a transformer interconnecting the converter with the point of common coupling. The grid shunt impedance may model an electrical filter interconnected with the point of common coupling. The electrical filter may earth the point of common coupling.

According to an embodiment of the invention, a reduced coupled system model is calculated by determining a first coupled system model with the grid elements having a first set of grid emulator parameters and a second coupled system model with the grid elements having a second set of grid emulator parameters and by analytically eliminating the grid emulator parameters by putting the equations of the second coupled system model into the equations of the first coupled system model. The sets of grid emulator parameters may be different in the sense that at least one of the parameters, such as a voltage source or a specific impedance, are different from each other. It may be that there are parameters present, which are equal.

It may be that the equations modelling the coupled system are analytically solvable with respect to the converter Thevenin voltage source and the converter Thevenin impedance, when two different sets of grid emulator parameters are used in the equations. In this case, the grid emulator parameters may be eliminated from the set of equations, and equations solely in the converter Thevenin voltage source, the converter Thevenin impedance, and two sets of measurements values, which have to be measured, when the respective set of grid emulator parameters is implemented in the grid emulator system.

According to an embodiment of the invention, the measurement values are input into the reduced coupled system model. The elimination of the grid emulator parameters may be performed offline, i.e. before the method is performed and solely the resulting equations, i.e. the reduced coupled system model, may be implemented as function in a computing device performing the method.

According to an embodiment of the invention, the grid emulator system comprises an adjustable electrical component, such that the grid emulator parameters are changed, when the electrical component is adjusted. For example, the adjustable component is at least one of a filter circuit with an exchangeable capacitor and/or exchangeable inductor, and/or a converter with an adjustable modulation scheme. The grid emulator parameters may be or may comprise known impedances of the filter circuit with different capacitors and/or different inductors. The grid emulator parameters also may be or may comprise known voltage sources, which model the converter at different operation schemes, such as different frequencies, modulation schemes.

According to an embodiment of the invention, two sets of measurement values of the coupling point voltage and of the coupling point current are determined with the electrical component adjusted to different settings, wherein the two sets of measurement values are input into the reduced system model. It may be that a first set of measurement values is determined in a first pass with the grid emulator system configured, such that it may be modelled with first grid emulator parameters. After that, the grid emulator system may be reconfigured, for example a capacitor and/or inductor may be exchanged. The grid emulator system then may be modelled with second grid emulator parameters. In a second pass, after the reconfiguration, a second set of measurement values may be determined.

The reduced coupled model has been determined, such that the converter Thevenin voltage source and the converter Thevenin impedance can be determined from solely the two sets of measurement values, since the grid emulator parameters have been eliminated. In such a way, inaccuracies related to the grid emulator parameters, which may slightly be different from the real ones, may be reduced.

According to an embodiment of the invention, at least three sets of measurement values of the coupling point voltage and of the coupling point current are determined with the electrical component adjusted to at least three different settings. Pairs of sets of measurement values may be generated by combining two different sets of measurement values. The two sets of measurement values of each pair may be input into the reduced system model to produce a converter Thevenin impedance and a converter Thevenin voltage source for each pair. It is possible to perform more than two passes with different configurations of the grid emulator system, wherein in each pass, a set of measurement values is determined. In such a way, several intermediate converter Thevenin impedances and intermediate converter Thevenin voltage sources may be determined, which may vary from each other due to measurement inaccuracies.

The final converter Thevenin impedance and the final converter Thevenin voltage source for the converter Thevenin equivalent model may then be determined by applying statistical methods to the intermediate converter Thevenin impedances and intermediate converter Thevenin voltage sources. For example, the intermediate converter Thevenin impedances and the intermediate converter Thevenin voltage sources may be averaged.

According to an embodiment of the invention, in the coupled system model, the grid emulator system is modelled with a grid Thevenin equivalent model, which comprises a grid Thevenin impedance and a grid Thevenin voltage source. It also may be that a Thevenin equivalent model is used for the grid emulator system. The parameters of this model, i.e., the grid Thevenin impedance and the grid Thevenin voltage source, may be determined from the parameters of the real components of the grid emulator system.

According to an embodiment of the invention, the grid Thevenin impedance and the grid Thevenin voltage source are determined from known parameters of electrical components of the grid emulator system. Such components may be a converter, a transformer, a filter, etc., as described above.

According to an embodiment of the invention, a plurality of sets of measurement values of the coupling point voltage and of the coupling point current are determined with the electrical component adjusted to different settings. As already mentioned, each set of measurement values may be determined with respect to a specific configuration of the grid emulator system (for example such as different capacitors, inductors, transformers, a different modulation scheme of the converter, etc.). Such different modulation schemes may include adding different types of noise, changing a carrier frequency, changing an amplitude and/or phase of a reference voltage, etc.

From the plurality of sets of measurement values, a plurality of intermediate converter Thevenin impedances and converter Thevenin voltage sources may be determined. This may be done with the reduced coupled system model, by forming pairs of sets of measurement values. This also may be done by inputting each set into a coupled system model with the respective grid emulator parameters set to the corresponding configuration. Also this two methods may be mixed.

According to an embodiment of the invention, the final converter Thevenin impedance is determined by eliminating outlier values from the intermediate converter Thevenin impedances at different frequency values. It may be that the intermediate converter Thevenin impedances vary much more with respect to each other than the converter Thevenin voltage sources. Therefore, statistical methods may be applied to the intermediate converter Thevenin impedances, such as outlier detection and/or averaging.

According to an embodiment of the invention, the final converter Thevenin impedance is determined by averaging the intermediate converter Thevenin impedances, in particular from the ones from which outliers have been removed. It also may be that the final converter Thevenin impedance is averaged with respect to neighbouring frequencies, i.e. that the final converter Thevenin impedance is smoothed.

According to an embodiment of the invention, the final converter Thevenin voltage source is determined by averaging the intermediate converter Thevenin voltage sources. It also may be that outlier detection is applied to the intermediate converter Thevenin voltage sources. It also may be that the final converter Thevenin voltage source is averaged with respect to neighbouring frequencies, i.e. that the final converter Thevenin voltage source is smoothed.

According to an embodiment of the invention, the grid emulator system comprises an electrical converter connected to an electrical grid, which electrical converter is adapted for converting a grid voltage from the electrical grid into the supply voltage to be supplied to the converter system.

The electrical converter may be modelled as voltage source in a grid emulator model. By using different modulation schemes and/or frequencies, grid emulator parameters of this voltage source may be set to different values.

According to an embodiment of the invention, the grid emulator system comprises a transformer connected between an output of the electrical converter and the point of common coupling. The transformer may be modelled as an impedance in the grid emulator model.

According to an embodiment of the invention, the grid emulator system comprises an electrical filter, which may be connected to the point of common coupling on one side and/or which may be earthed, delta-connected and/or star-connected on the other side. The filter may be modelled as a further impedance in the grid emulator model. The filter may comprise a capacitor and/or an inductance, which may be exchanged for setting the grid emulator parameters of this impedance to different values.

According to an embodiment of the invention, the measurement values of the coupling point voltage and of the coupling point current are Fourier transformed before being input into the coupled system model. It may be that the calculations of the converter Thevenin impedance and the converter Thevenin voltage source are performed in the frequency domain. The measurement values acquired over a time period (for example of each set of measurement values) may be discretely Fourier transformed. The equations may be formulated in the frequency domain.

In the end, the converter Thevenin impedance and the converter Thevenin voltage source may be calculated with respect to a set of frequencies. It also may be that the grid Thevenin impedance and the grid Thevenin voltage source, which may be used in the coupled system model, are provided with respect to a set of frequencies. The set of frequencies may be the frequencies bins determined with the Fourier transform.

It also may be that for different sets of measurement values, which have been acquired during different passes with different grid emulator configurations, the complex phases are adjusted to each other, such that all sets have equivalent phases at a specific frequency. This may improve the determination of the converter Thevenin voltage source and converter Thevenin impedance. In particular, the complex phases of two sets of measurement values forming a pair input into the reduced coupled system model may be adjusted in such a way.

A further aspect of the invention relates to a computer program for determining a converter Thevenin equivalent model for a converter system, which, when being executed on a processor, is adapted for performing the method as described above and below.

For example, the computer program may be stored in a controller of the grid emulator system and/or in an evaluation device connected to measurement sensors at the point of common coupling.

The controller and/or the evaluation device may comprise a processor with a memory adapted for performing the computer program.

A further aspect of the invention relates to a computer-readable medium, in which such a computer-program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to an evaluation device for determining a converter Thevenin equivalent model for a converter system, wherein the evaluation device is adapted for performing the method as described above and below. A controller of a grid emulator system may be such an evaluation device. It also is possible that the measurement values generated with the grid emulator system are stored and/or transmitted to a further computing device, such as a PC, and evaluated there. Also this further computing device may be an evaluation device.

A further aspect of the invention relates to a test system, which comprises a grid emulator system for supplying the converter system with a supply voltage and an evaluation device, such as described above and below. With the test system, the converter Thevenin equivalent model may be determined without the need for further equipment.

It has to be understood that features of the method as described in the above and in the following may be features of the computer program, the computer-readable medium, the evaluation device and the test system as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
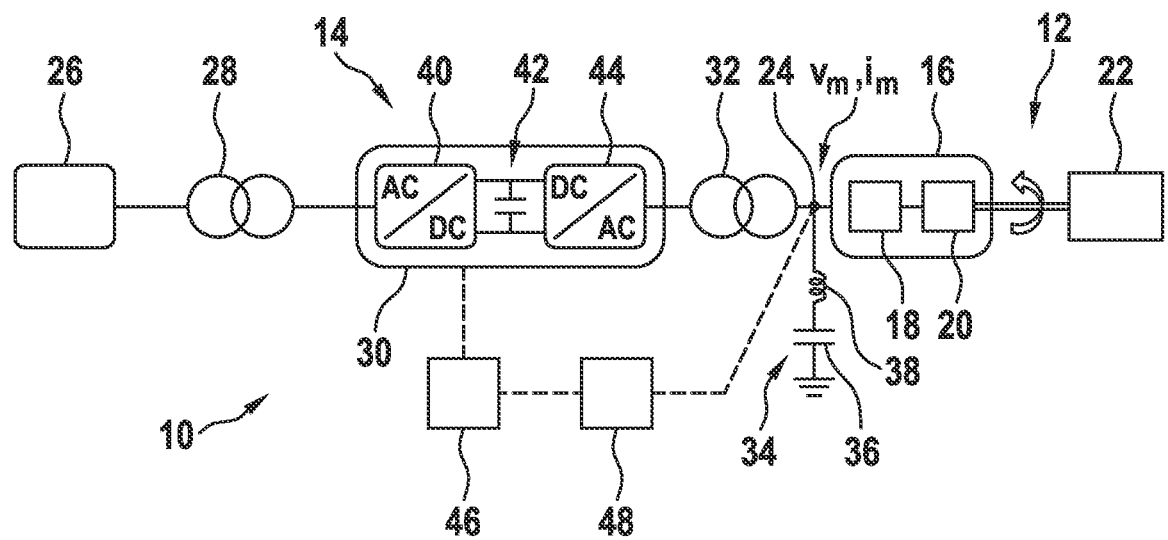
FIG. 1 schematically shows a test system according to an embodiment of the invention.

FIG. 1 shows a test system 10 comprising a converter system 12 and a grid emulator system 14. The converter system 12 comprises an electrical drive 16, which is composed of a converter 18 and a rotating electrical machine 20. The electrical drive 16 is mechanically connected to a prime mover 22, such as a turbine. Fluctuating power may be exchanged between the prime mover 22 and the electrical drive 16. However, the converter system 12 also com comprise other types of converters and/or may be used for other purposes, such as interconnecting two electrical grids or being feed by a photovoltaic system.

Due to test reasons, the converter system 12 and in particular the electrical drive 16 are supplied by the grid emulator system 14 with an AC supply voltage $v_m$ and an AC supply current $i_m$. The grid emulator system 14 and the converter system 12 are connected via a point of common coupling 24.

The grid emulator system 14 itself is supplied by an electrical grid 26. The grid emulator system 14 comprises an optional input transformer 28 connected to the grid 26, a converter 30 and an output transformer 32, which are all series connected between the electrical grid 26 and the point of common coupling 24. The point of common coupling 24 is earthed via a filter 34, which may comprise capacitors 36 and/or inductors 38.

The converter 30 may comprise an AC-DC converter 40, a DC link 42 and a DC-AC converter 44. The converter 30 may be of two level, three level or multilevel type. The converter 30 may be controlled with a controller 46, which may be adapted for generating switching signals for semi-conductor switches of the converter 30. An evaluation device 48 may receive measurement values of the supply voltage $v_m$ and the supply current $i_m$ at the point of common coupling 24 and may determine a Thevenin equivalent model of the converter system 12 as described above and below.

Figure 2:
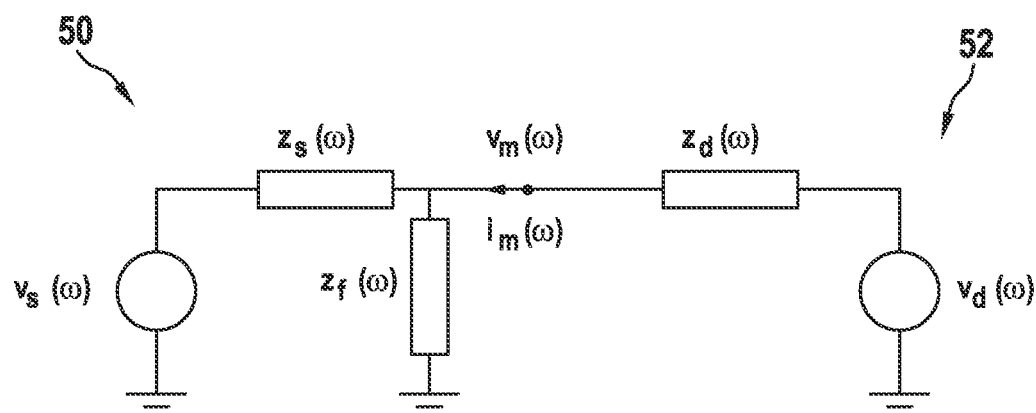
FIG. 2 shows an equivalent circuit for the test system of FIG. 1.

FIG. 2 shows an equivalent circuit 50 for the test system 10. Here, the left side corresponds to the grid emulator system 14 modelled by the series element $z_s(\omega)$, which models the transformer 32, and a shunt element $z_f(\omega)$, which models the filter 34 and the voltage source $v_s(\omega)$, which models the converter 30.

The right side corresponds to the converter system 12 modelled with a Thevenin equivalent model 52, which is composed of a Thevenin voltage source $v_d(\omega)$ and a Thevenin impedance $z_d(\omega)$.

Note that all these parameters are provided in the frequency domain with respect to the frequency $\omega$.

Figure 3:
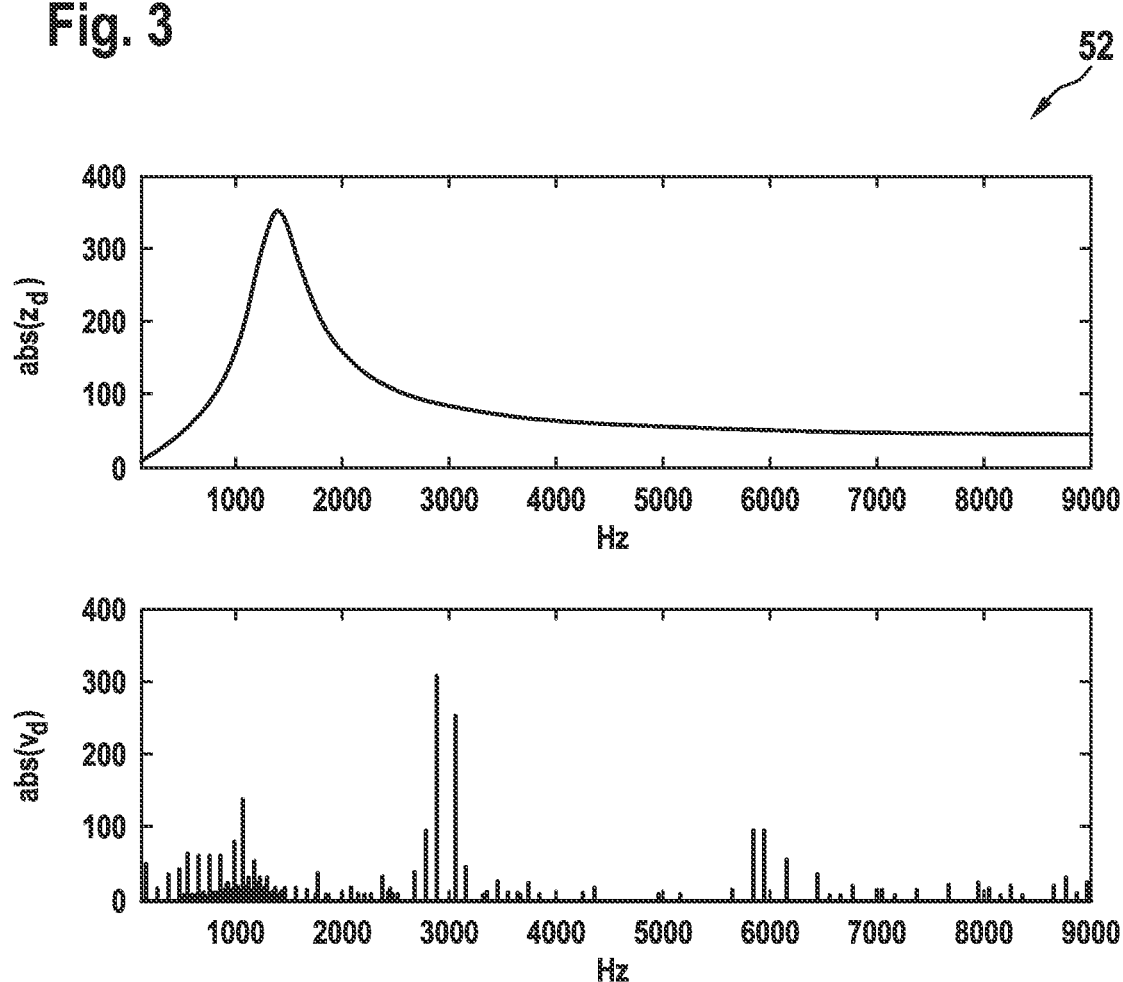
FIG. 3 shows a diagram with curves for a Thevenin equivalent model of the converter system of FIG. 1.

FIG. 3 shows a diagram with the absolute values of a converter Thevenin voltage source $v_d(\omega)$ and a converter Thevenin impedance $z_d(\omega)$, expected for a typical converter system 12. The converter Thevenin impedance $z_d(\omega)$ is a continuous curve peaked at a specific value, wherein the Thevenin voltage source $v_d(\omega)$ comprises values different from 0 at discrete frequencies, which correspond to the higher order harmonics of the converter system 12. The Thevenin equivalent model 52 is a commonly used model for the analysis of the steady state impact of converter harmonics on the grid 26.

In general, the Thevenin voltage source $v_d(\omega)$ and the Thevenin impedance $z_d(\omega)$ may be modelled for a discrete set of frequencies and by a complex number for each frequency. The Thevenin voltage source $v_d(\omega)$ may be seen as a harmonic injection at various frequencies with different magnitudes.

The Thevenin voltage source $v_d(\omega)$ may strongly depend on the modulation strategy, converter topology of the converter 18 but also may be influenced by passive filter components, such as 34.

Also, the Thevenin impedance $z_d(\omega)$ may be strongly influenced by passive filter components, such as 34, but also may be influenced by the control system and sampling delays introduced. With the method as described above and below, an accurate determination of the parameters $v_d(\omega)$, $z_d(\omega)$ of the Thevenin equivalent model 52 of the converter system 12 may be performed with the test system shown in FIG. 1.

As the hardware of the grid emulator system 14 is known, the parameters $z_s(\omega)$, $z_f(\omega)$ and $v_s(\omega)$ of FIG. 2 may be considered known and an equivalent Thevenin model 54 of the grid emulator can be derived as follows, resulting in the simplified equivalent circuit 56 shown in FIG. 4

$$v_{th}^s(\omega) = \frac{z_f(\omega)}{z_f(\omega) + z_s(\omega)} v_s(\omega)$$

$$z_{th}^s(\omega) = \frac{z_f(\omega) z_s(\omega)}{z_f(\omega) + z_s(\omega)}$$

Here, the Thevenin voltage source $v_{th}^s(\omega)$ and the Thevenin impedance $z_{th}^s(\omega)$ of the grid emulator system 14 have been introduced.

The measurements of the voltage $v_m(t)$ and the current $i_m(t)$ at the point of common coupling 24, which are time-dependent signals, can be transformed into the Frequency domain through a discrete Fourier transform, resulting in the frequency dependent voltage $v_m(\omega)$ and current $i_m(\omega)$. A sample rate for the measurements may be of at least twice but preferably 5 times the desired frequency range of the models, such as a sample rate of 10-50 kHz. It also may be beneficial to perform the measurement during stationary operating conditions.

The Fourier transformed measurements $v_m(\omega)$, $i_m(\omega)$ will have contributions from both the grid emulator system 14 and from the converter system 12.

$$v_m(\omega) = \underbrace{v_{th}^s(\omega) \frac{z_d(\omega)}{z_{th}^s(\omega) + z_d(\omega)}}_{\text{grid emulator contribution}} + \underbrace{v_d(\omega) \frac{z_{th}^s(\omega)}{z_{th}^s(\omega) + z_d(\omega)}}_{\text{converter contribution}}$$

$$i_m(\omega) = \underbrace{-\frac{v_{th}^s(\omega)}{z_{th}^s(\omega) + z_d(\omega)}}_{\text{grid emulator contribution}} + \underbrace{\frac{v_d(\omega)}{z_{th}^s(\omega) + z_d(\omega)}}_{\text{converter contribution}}$$

Unless compensated for, the harmonics introduced by the grid emulator system 14 usually will introduce bias and other inaccuracies in an estimation of the unknown Thevenin equivalent parameters $v_d(\omega)$, $z_d(\omega)$.

Figure 5:
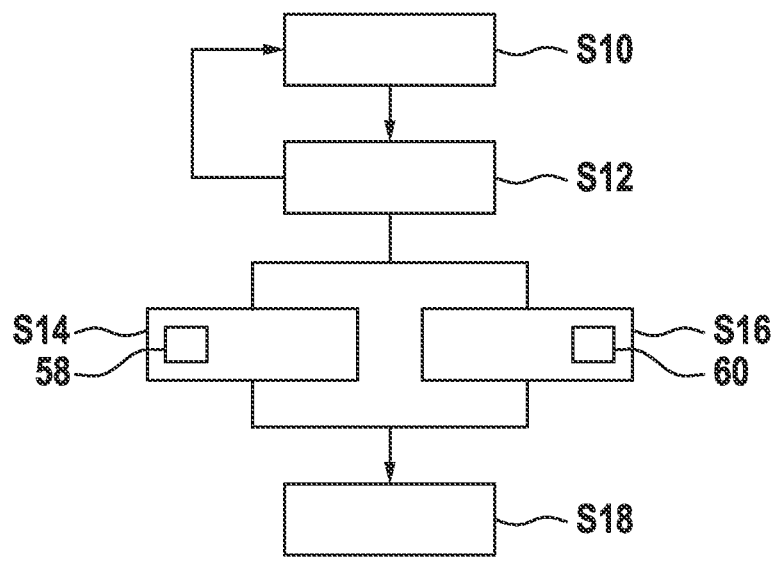
FIG. 5 shows a flow diagram for determining a Thevenin equivalent model according to an embodiment of the invention.

With respect to FIG. 5, a method is described, with which the converter Thevenin voltage source $v_d(\omega)$ and the converter Thevenin impedance $z_d(\omega)$ may be simultaneously and accurately determined. Background harmonics introduced by the grid emulator system 14 are compensated. The method may be automatically performed by the evaluation device 48.

In step S10, measurement values of the coupling point voltage $v_m$ and of the coupling point current $i_m$ measured at the point of common coupling 24 are determined, wherein the grid emulator system 14 supplies the converter system 12 with a supply voltage. The grid emulator system 14 may emulate an electrical grid by generating a specific frequency and a specific output voltage magnitude. The measurement values of the coupling point voltage $v_m$ and of the coupling point current $i_m$ may be Fourier transformed into Fourier transformed quantities $v_m(\omega)$, $i_m(\omega)$ before being further processed in step S14 and/or step S16.

For the steps S14 and S16, several sets of measurement values may be needed, which may be generated with respect to different operating points of the grid emulator system 14. Therefore, in step S12, the grid emulator system 14 may be changed, such that it operates at a different operation point. This may be done automatically by the evaluation device 48, which may instruct the converter 30 to change its modulation scheme, for example. It also may be that the grid emulator system 14 is modified manually, by exchanging a component, such as 36, 38.

The grid emulator system 14 may comprise for this an adjustable electrical component, such as the converter 30 and/or the filter 34, such that at least some of the grid emulator parameters $z_s(\omega)$, $z_f(\omega)$ and $v_s(\omega)$ are changed, when the electrical component 30, 34 is adjusted. For example, the adjustable component may be at least one of a filter circuit 34 with an exchangeable capacitor 36 and/or exchangeable inductor 38. The adjustable component also may be a converter 30 with an adjustable modulation scheme.

After the adjustment of the grid emulator system 14, the method may continue in step S10 and a further set of measurement values may be generated. It may be that a plurality of sets of measurement values of the coupling point voltage and of the coupling point current are determined with the electrical component adjusted to different settings.

In the steps S14 and S16, which may be performed both or only one of them, from the measurement values at least one converter Thevenin impedance $v_d(\omega)$ and at least one converter Thevenin voltage source $v_d(\omega)$ is determined.

In step S14, these quantities are determined with a model 58 of the coupled system, which comprises parameters of the grid emulator system 14. In step S16, these quantities are determined with a reduced model 60, where at least some of the parameters of the grid emulator system 14 have been eliminated.

In general, the coupled system model 58 and the reduced coupled system model 60 comprise equations modelling the converter system 12 and the grid emulator system 14 and from which the converter Thevenin impedance $z_d(\omega)$ and the converter Thevenin voltage source $v_d(\omega)$ are calculated. Both models 58, 60 may comprise the functions implemented as software routines, in which the measurement values are input and the quantities $z_d(\omega)$ and $v_d(\omega)$ are output. Note that the converter Thevenin impedance $v_d(\omega)$ and the converter Thevenin voltage source $v_d(\omega)$ may be calculated with respect to a set of frequencies, such as the frequency bins determined during Fourier transform of the measurement values.

Figure 4:
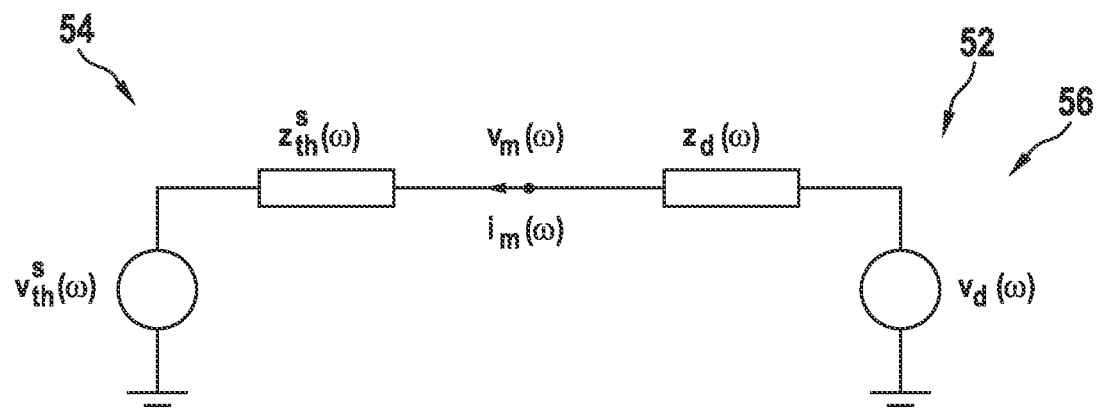
FIG. 4 shows a simplified equivalent circuit for the test system of FIG. 1.

For deriving the coupled system model 58, based on the simplified equivalent circuit 56 in FIG. 4, Kirchhoff's laws gives the following relations:

$$v_m(\omega) = v_d(\omega) + i_m(\omega) z_d(\omega)$$

$$i_m(\omega) = \frac{v_d(\omega) - v_{th}^s(\omega)}{z_{th}^s(\omega) + z_d(\omega)}$$

From these equations, the expressions for the unknown quantities can be solved:

$$v_d(\omega) = \frac{v_m(\omega) + v_{th}^s(\omega) + i_m(\omega) z_{th}^s(\omega)}{2}$$

$$z_d(\omega) = \frac{v_{th}^s(\omega) - v_m(\omega) + i_m(\omega) z_{th}^s(\omega)}{-2 i_m(\omega)}$$

Thus, the unknown quantities $v_d(\omega)$, $z_d(\omega)$ may be found from a single set of measurement values $v_m(\omega)$ and $i_m(\omega)$, provided the parameters $v_{th}^s(\omega)$, $z_{th}^s(\omega)$ of the grid emulator system Thevenin equivalent 54 known. The above equations for $v_d(\omega)$, $z_d(\omega)$ may be seen as the coupled system model 58.

As the grid emulator system 14 may be part of the laboratory equipment, it may be manufactured using high quality components, such that its parameters may be considered nearly perfectly known. For the case of a grid emulator system 14, for example with an LC filter 34, as shown in FIG. 1, the Thevenin impedance $z_{th}^s(\omega)$ of grid emulator system 14 can be calculated as $$z_{th}^s(\omega) = \frac{z_f(\omega) z_s(\omega)}{z_f(\omega) + z_s(\omega)}$$

Furthermore, the converter voltage $v_s(\omega)$ can be measured in the grid emulator system 14, the Thevenin voltage source $v_{th}^s(\omega)$ can be calculated as $$v_{th}^s(\omega) = \frac{z_f(\omega)}{z_f(\omega) + z_s(\omega)} v_s(\omega)$$

This may be sensitive to noise, and while it may provide satisfactory results, it may be beneficial to estimate the unknown parameters $v_d(\omega)$, $z_d(\omega)$ using multiple sets of measurement values, for example as discussed below.

In summary, in the coupled system model 58, the grid emulator system 14 may be modelled with a grid Thevenin equivalent model 54, which comprises a grid Thevenin impedance $z_{th}^s(\omega)$ and a grid Thevenin voltage source $v_{th}^s(\omega)$. The grid Thevenin impedance $z_{th}^s(\omega)$ and the grid Thevenin voltage source $v_{th}^s(\omega)$ may be determined from known parameters of electrical components 30, 32, 34 of the grid emulator system 14. Note that the grid Thevenin impedance $z_{th}^s(\omega)$ and the grid Thevenin voltage source $v_{th}^s(\omega)$ may be provided with respect to a set of frequencies a.

In step S16, the unknown quantities $v_d(\omega)$, $z_d(\omega)$ are determined with the reduced coupled system model 60. In this case, at least two sets of measurement values have to be determined in step S10 with respect to different operation points of the grid emulator system 14.

When one assumes that the parameters $v_d(\omega)$, $z_d(\omega)$ of the converter Thevenin equivalent model 52 stay the same for the two sets of measurement values, Kirchhoff's equations for the equivalent circuit 50 in FIG. 2 can be used to solve for the unknown Thevenin parameters $v_d(\omega)$ and $z_d(\omega)$.

$-v_{s1}(\omega) - z_{s1}(\omega) i_{c1}(\omega) + z_{f1}(\omega)(i_{m1}(\omega) - i_{c1}(\omega)) = 0$ $-z_{f1}(\omega)(i_{m1}(\omega) - i_{c1}(\omega)) - i_{m1}(\omega) z_d(\omega) + v_d(\omega) = 0$ $i_{m1}(\omega)) - i_{c1}(\omega) - v_{m1}(\omega) / z_{f1}(\omega) = 0$ $-v_{s2}(\omega) - z_{s2}(\omega) i_{c2}(\omega) + z_{f2}(\omega)(i_{m2}(\omega) - i_{c2}(\omega)) = 0$ $-z_{f2}(\omega)(i_{m2}(\omega) - i_{c2}(\omega)) - i_{m2}(\omega) z_d(\omega) + v_d(\omega) = 0$ $i_{m2}(\omega) - i_{c2}(\omega) - v_{m2}(\omega) / z_{f2}(\omega) = 0$ The indices 1 and 2 refer to the two different measurement passes, i.e. different sets of measurement values and/or the two different operation points. Here, changes in the filter circuit would imply that $z_{s1}(\omega) \neq z_{s2}(\omega)$ or $z_{f1}(\omega) \neq z_{f2}(\omega)$, and changes in the modulation strategy, switching frequency, DC link chopper or AC chopper units of the grid emulator converter would imply that $v_{s1}(\omega) \neq v_{s2}(\omega)$. To make the equations linearly independent, at least some of these parameters need to be different between the different measurement passes, for every frequency value.

Based on this extended set of equations, expressions for the unknown quantities $v_d(\omega)$, $z_d(\omega)$ can be solved, yielding $$v_d(\omega) = \frac{i_{m1}(\omega) v_{m2}(\omega) - i_{m2}(\omega) v_{m1}(\omega)}{i_{m1}(\omega) - i_{m2}(\omega)}$$

$$z_d(\omega) = \frac{v_{m2}(\omega) - v_{m1}(\omega)}{i_{m1}(\omega) - i_{m2}(\omega)}$$

Note that, compared to the case of step S14, the grid emulator Thevenin parameters do not occur in the equations and thus, this approach may be used also when those parameters are not perfectly known, which may be an advantage. The above equations for $v_d(\omega)$, $z_d(\omega)$ may be seen as the reduced coupled system model 60.

In summary, the reduced coupled system model 60 is calculated by determining a first coupled system model with the grid elements having a first set of grid emulator parameters and a second coupled system model with the grid elements having a second set of grid emulator parameters and by analytically eliminating the grid emulator parameters by putting the equations of the second coupled system model into the equations of the first coupled system model. The two sets of measurement values, which are input into the reduced system model 60, are then determined with the electrical component adjusted to different settings.

If a number n of measurement passes is made, those can be paired 1 by 1 in $$\binom{n}{2}$$

combinations. For example, if 5 separate experiments with different parameters for the grid emulator system 14 have been made, those can be combined in $$\binom{5}{2} = 10$$

unique combinations of pairs. At least three sets of measurement values of the coupling point voltage $v_m$ and of the coupling point current $i_m$ may be determined with the electrical component 30, 34 adjusted to at least three different settings. Pairs of sets of measurement values may be generated by combining two different sets of measurement values. The two sets of measurement values of each pair then may be input into the reduced system model 60 to produce a converter Thevenin impedance $z_d(\omega)$ and a converter Thevenin voltage source $v_d(\omega)$ for each pair.

After steps S14 and S16, a plurality of intermediate converter Thevenin impedances $z_d(\omega)$ and intermediate converter Thevenin voltage sources $v_d(\omega)$ are present.

Figure 6:
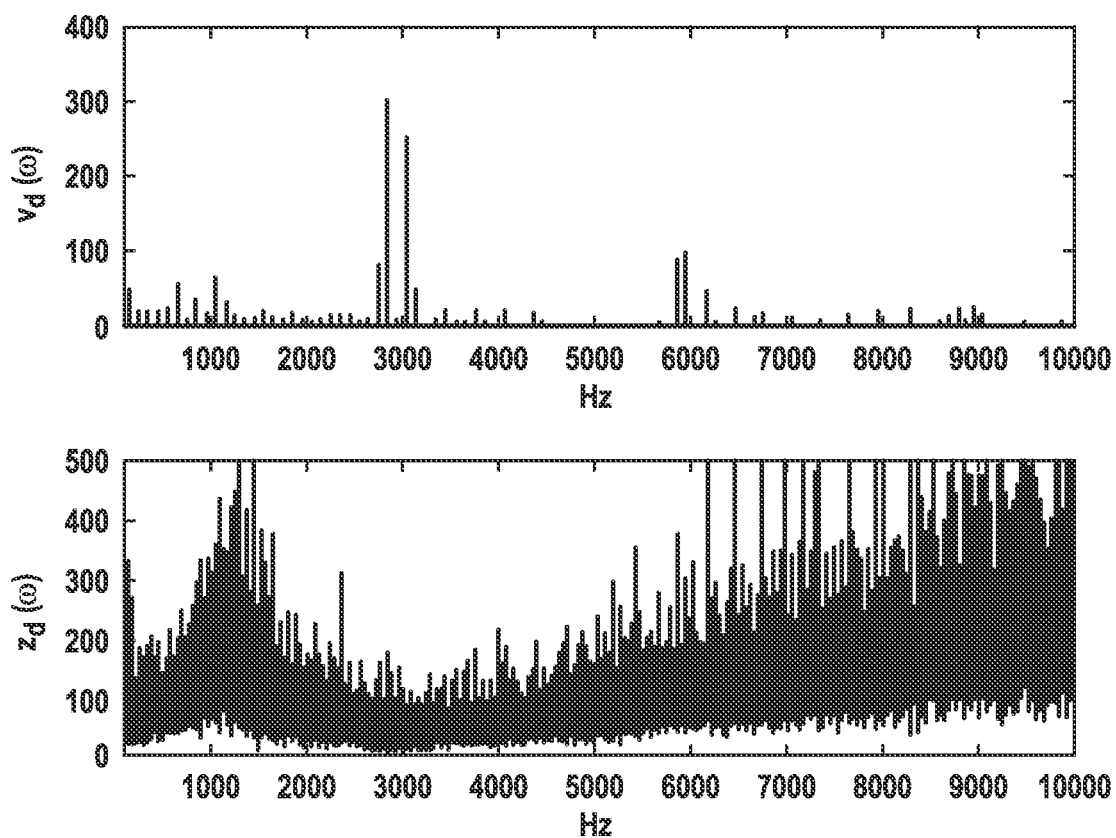
FIG. 6 shows a diagram with curves of a Thevenin equivalent model determined with the method of FIG. 5.

FIG. 6 shows an example of an intermediate converter Thevenin impedance $z_d(\omega)$ and an intermediate converter Thevenin voltage source $v_d(\omega)$, which may have been produced as described above. As can be seen, in particular, the intermediate converter Thevenin impedance $z_d(\omega)$ is rather noise and may be further processed to receive a smooth curve.

Figure 7:
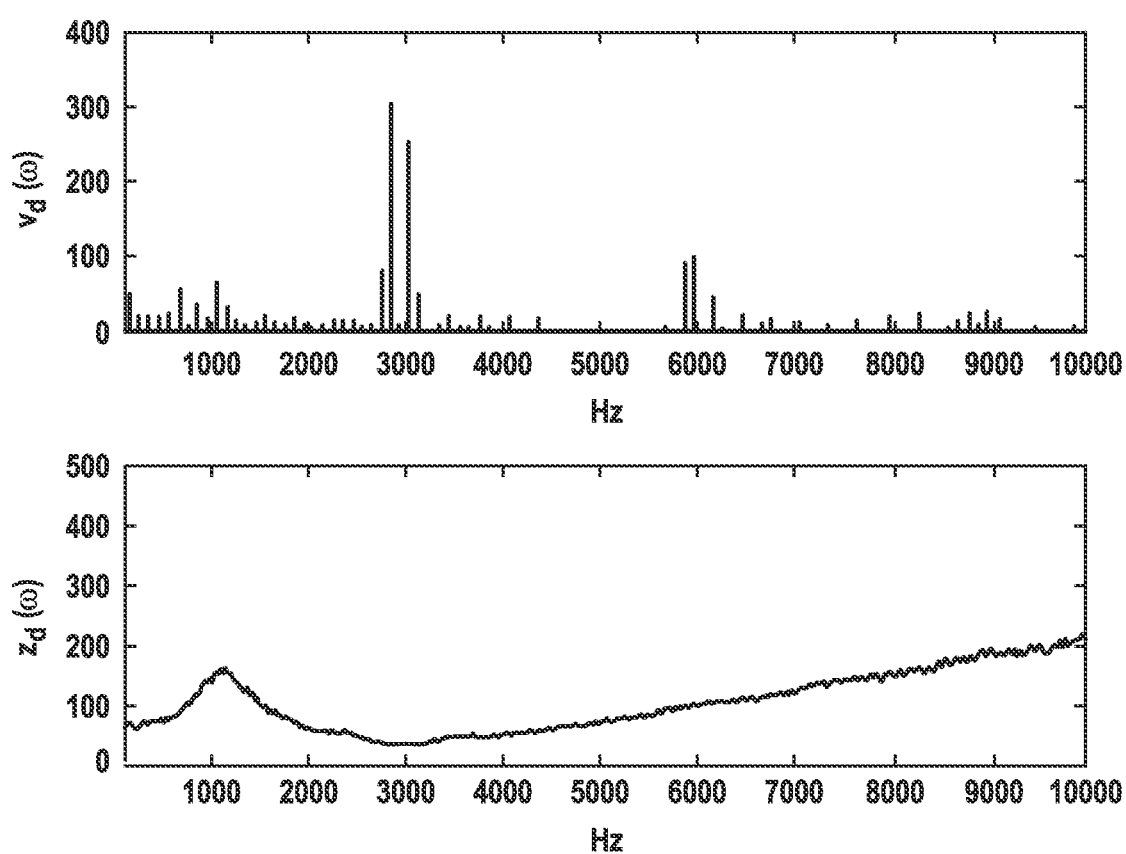
FIG. 7 shows a diagram with curves of a further Thevenin equivalent model determined with the method of FIG. 5.

In step S18, the intermediate converter Thevenin impedances $z_d(\omega)$ and intermediate converter Thevenin voltage sources $v_d(\omega)$ may be statistically evaluated to generate the final converter Thevenin impedance $z_d(\omega)$ and the final converter Thevenin voltage source $v_d(\omega)$, such as shown in FIG. 7. With such statistical method, noise in the results may be reduced.

Statistical evaluation may comprise averaging, outlier elimination and smoothing.

The final converter Thevenin impedance $z_d(\omega)$ and/or the final converter Thevenin voltage source $v_d(\omega)$ may be determined by averaging the intermediate converter Thevenin impedances $z_d(\omega)$ and the intermediate converter Thevenin voltage sources $v_d(\omega)$, for example such as determined for each pair of measurement values in step S16. Averaging may be done for by averaging values at the same frequency.

Alternatively or additionally, the final converter Thevenin impedance $z_d(\omega)$ may be determined by eliminating outlier values from the intermediate converter Thevenin impedances $z_d(\omega)$. This may be done by eliminating outlier values at the same frequency values.

In a final step, the Thevenin impedance $z_d(\omega)$ may be smoothed. For example, a Butterworth low pass filter may be applied to smoothen the Thevenin impedance $z_d(\omega)$, such as shown in the lower diagram of FIG. 7. Bidirectional filtering may be used to ensure that there is no frequency shift of the Thevenin impedance as a result of smoothing.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 test system
12 converter system
14 grid emulator system
16 electrical drive
18 drive converter
20 rotating electrical machine
22 prime mover
$v_m$ AC supply voltage
$i_m$ AC supply current
24 point of common coupling
26 electrical grid
28 input transformer
30 emulator converter
32 output transformer
34 electrical filter
36 capacitor
38 inductor
40 AC-DC converter
42 DC link
44 DC-AC converter
46 controller
48 evaluation device
50 equivalent circuit
$\omega$ frequency
$z_s(\omega)$ series element for grid emulator model
$z_f(\omega)$ shunt element for grid emulator model
$v_s(\omega)$ voltage source for grid emulator model
52 converter Thevenin equivalent model
$v_d(\omega)$ converter Thevenin voltage source
$z_d(\omega)$ converter Thevenin impedance
$v_{th}^s(\omega)$ grid emulator Thevenin voltage source
$z_{th}^s(\omega)$ grid emulator Thevenin impedance
$v_m(\omega)$ Fourier transformed voltage measurements
$i_m(\omega)$ Fourier transformed current measurements
54 equivalent Thevenin model of the grid emulator
56 simplified equivalent circuit
58 coupled system model
60 reduced coupled system model

The invention claimed is:

1. A method for determining a converter Thevenin equivalent model for a converter system, the method comprising:
receiving measurement values of a coupling point voltage and of a coupling point current measured at a point of common coupling between a grid emulator system and the converter system, wherein the grid emulator system supplies the converter system with a supply voltage;
determining a converter Thevenin impedance and a converter Thevenin voltage source of the converter Thevenin equivalent model by inputting the measurement values of the coupling point voltage and of the coupling point current into a coupled system model, which comprises equations modelling the converter system and the grid emulator system and from which the converter Thevenin impedance and the converter Thevenin voltage source are calculated; and
using the converter Thevenin impedance and the converter Thevenin voltage in the converter Thevenin equivalent model to optimize operation of a large-scale electrical grid;
wherein the grid emulator system is modelled with a set of grid emulator elements, each of which has grid emulator parameters;
wherein a reduced coupled system model is calculated by determining a first coupled system model with grid elements having a first set of grid emulator parameters and a second coupled system model with grid elements having a second set of grid emulator parameters and by analytically eliminating the grid emulator parameters by putting equations of the second coupled system model into equations of the first coupled system model; and
wherein the measurement values are input into the reduced coupled system model.

2. The method of claim 1,
wherein the grid emulator parameters comprise at least one of:
a grid voltage source;
a grid series impedance interconnecting the grid voltage source with the point of common coupling; and
a grid shunt impedance connected to the point of common coupling.

3. The method of claim 1,
wherein the grid emulator system comprises an adjustable electrical component, such that the grid emulator parameters are changed, when the adjustable electrical component is adjusted;
wherein two sets of measurement values of the coupling point voltage and of the coupling point current are determined with the adjustable electrical component adjusted to different settings;
wherein the two sets of measurement values are input into the reduced system model.

4. The method of claim 3,
wherein the adjustable electrical component comprises at least one of:
a filter circuit with an exchangeable capacitor and/or exchangeable inductor; and
a converter with an adjustable modulation scheme.

5. The method of claim 4,
wherein at least three sets of measurement values of the coupling point voltage and of the coupling point current are determined with the adjustable electrical component adjusted to at least three different settings;
wherein pairs of sets of measurement values are generated by combining two different sets of measurement values;
wherein the two different sets set of measurement values of each pair are input into the reduced system model to produce a converter Thevenin impedance and a converter Thevenin voltage source for each pair; and
wherein the converter Thevenin impedance and the converter Thevenin voltage source for the converter Thevenin equivalent model is determined by averaging the converter Thevenin impedance and the converter Thevenin voltage source for each pair.

6. The method of claim 5,
wherein in the coupled system model, the grid emulator system is modelled with a grid Thevenin equivalent model, which comprises a grid Thevenin impedance and a grid Thevenin voltage source.

7. The method of claim 6,
wherein the grid Thevenin impedance and the grid Thevenin voltage source are determined from known parameters of electrical components of the grid emulator system.

8. The method of claim 7,
wherein the grid emulator system comprises an adjustable electrical component, such that the grid emulator parameters are changed, when the adjustable electrical component is adjusted;
wherein a plurality of sets of measurement values of the coupling point voltage and of the coupling point current are determined with the adjustable electrical component adjusted to different settings;
wherein from the plurality of sets of measurement values, a plurality of intermediate converter Thevenin impedances and intermediate converter Thevenin voltage sources are determined; and
wherein a final converter Thevenin impedance is determined by eliminating outlier values from the intermediate converter Thevenin impedances at different frequency values and by averaging the intermediate converter Thevenin impedances.

9. The method of claim 1,
wherein the grid emulator system comprises an electrical converter connected to an electrical grid, which electrical converter is adapted for converting a grid voltage from the electrical grid into the supply voltage to be supplied to the converter system;
wherein the grid emulator system comprises a transformer connected between an output of the electrical converter and the point of common coupling; and
wherein the grid emulator system comprises an electrical filter connected to the point of common coupling.

10. The method of claim 1,
wherein the measurement values of the coupling point voltage and of the coupling point current are Fourier transformed before being input into the coupled system model;
wherein the converter Thevenin impedance and the converter Thevenin voltage source are calculated with respect to a set of frequencies; and
wherein a grid Thevenin impedance and a grid Thevenin voltage source are provided with respect to a set of frequencies.

11. The method of claim 3,
wherein at least three sets of measurement values of the coupling point voltage and of the coupling point current are determined with the adjustable electrical component adjusted to at least three different settings;
wherein pairs of sets of measurement values are generated by combining two different sets of measurement values;
wherein the two different sets set of measurement values of each pair are input into a reduced system model to produce a converter Thevenin impedance and a converter Thevenin voltage source for each pair; and
wherein the converter Thevenin impedance and the converter Thevenin voltage source for the converter Thevenin equivalent model is determined by averaging the converter Thevenin impedance and the converter Thevenin voltage source for each pair.

12. The method of claim 11, wherein in the coupled system model, the grid emulator system is modelled with a grid Thevenin equivalent model, which comprises a grid Thevenin impedance and a grid Thevenin voltage source.

13. The method of claim 1, wherein in the coupled system model, the grid emulator system is modelled with a grid Thevenin equivalent model, which comprises a grid Thevenin impedance and a grid Thevenin voltage source.

14. The method of claim 13, wherein the grid Thevenin impedance and the grid Thevenin voltage source are determined from known parameters of electrical components of the grid emulator system.

15. The method of claim 12, wherein the grid Thevenin impedance and the grid Thevenin voltage source are determined from known parameters of electrical components of the grid emulator system.

16. The method of claim 1, wherein the grid emulator system-comprises an adjustable electrical component, such that the grid emulator parameters are changed, when the adjustable electrical component is adjusted;
wherein a plurality of sets of measurement values of the coupling point voltage and of the coupling point current are determined with the adjustable electrical component adjusted to different settings;
wherein from the plurality of sets of measurement values, a plurality of intermediate converter Thevenin impedances and intermediate converter Thevenin voltage sources are determined; and
wherein a final converter Thevenin impedance is determined by eliminating outlier values from the plurality of intermediate converter Thevenin impedances at different frequency values and by averaging the plurality of intermediate converter Thevenin impedances.

17. The method of claim 12, wherein the grid emulator system-comprises an adjustable electrical component, such that the grid emulator parameters are changed, when the adjustable electrical component is adjusted;
  wherein a plurality of sets of measurement values of the coupling point voltage and of the coupling point current are determined with the adjustable electrical component adjusted to different settings;
  wherein from the plurality of sets of measurement values, a plurality of intermediate converter Thevenin impedances and intermediate converter Thevenin voltage sources are determined; and
  wherein a final converter Thevenin impedance is determined by eliminating outlier values from the plurality of intermediate converter Thevenin impedances at different frequency values and by averaging the plurality of intermediate converter Thevenin impedances.

18. A computer program stored on a non-transitory medium for determining a converter Thevenin equivalent model for a converter system, which, when being executed on a processor, is adapted for:
  receiving measurement values of a coupling point voltage and of a coupling point current measured at a point of common coupling between a grid emulator system and the converter system, wherein the grid emulator system supplies the converter system with a supply voltage;
  determining a converter Thevenin impedance and a converter Thevenin voltage source of the converter Thevenin equivalent model by inputting the measurement values of the coupling point voltage and of the coupling point current into a coupled system model, which comprises equations modelling the converter system and the grid emulator system and from which the converter Thevenin impedance and the converter Thevenin voltage source are calculated; and
  using the converter Thevenin impedance and the converter Thevenin voltage in the converter Thevenin equivalent model to optimize an operation of a large-scale electrical grid;
  wherein the grid emulator system is modelled with a set of grid emulator elements, each of which has grid emulator parameters;
  wherein a reduced coupled system model is calculated by determining a first coupled system model with grid elements having a first set of grid emulator parameters and a second coupled system model with grid elements having a second set of grid emulator parameters and by analytically eliminating the grid emulator parameters by putting the equations of second coupled system model into equations of the first coupled system model; and
  wherein the measurement values are input into the reduced coupled system model.

19. An evaluation device for determining a converter Thevenin equivalent model for a converter system, wherein the evaluation device is adapted for:
  receiving measurement values of a coupling point voltage and of a coupling point current measured at a point of common coupling between a grid emulator system and the converter system, wherein the grid emulator system supplies the converter system with a supply voltage;
  determining a converter Thevenin impedance and a converter Thevenin voltage source of the converter Thevenin equivalent model by inputting the measurement values of the coupling point voltage and of the coupling point current into a coupled system model, which comprises equations modelling the converter system and the grid emulator system and from which the converter Thevenin impedance and the converter Thevenin voltage source are calculated; and
  using the converter Thevenin impedance and the converter Thevenin voltage in the converter Thevenin equivalent model to optimize an operation of a large-scale electrical grid;
  wherein the grid emulator system is modelled with a set of grid emulator elements, each of which has grid emulator parameters;
  wherein a reduced coupled system model is calculated by determining a first coupled system model with grid elements having a first set of grid emulator parameters and a second coupled system model with grid elements having a second set of grid emulator parameters and by analytically eliminating the grid emulator parameters by putting equations of the second coupled system model into equations of the first coupled system model; and
  wherein the measurement values are input into the reduced coupled system model.

20. A test system, comprising:
  a grid emulator system for supplying the converter system with a supply voltage; and
  an evaluation device according to claim 14.

* * * * *